Figure 1B:
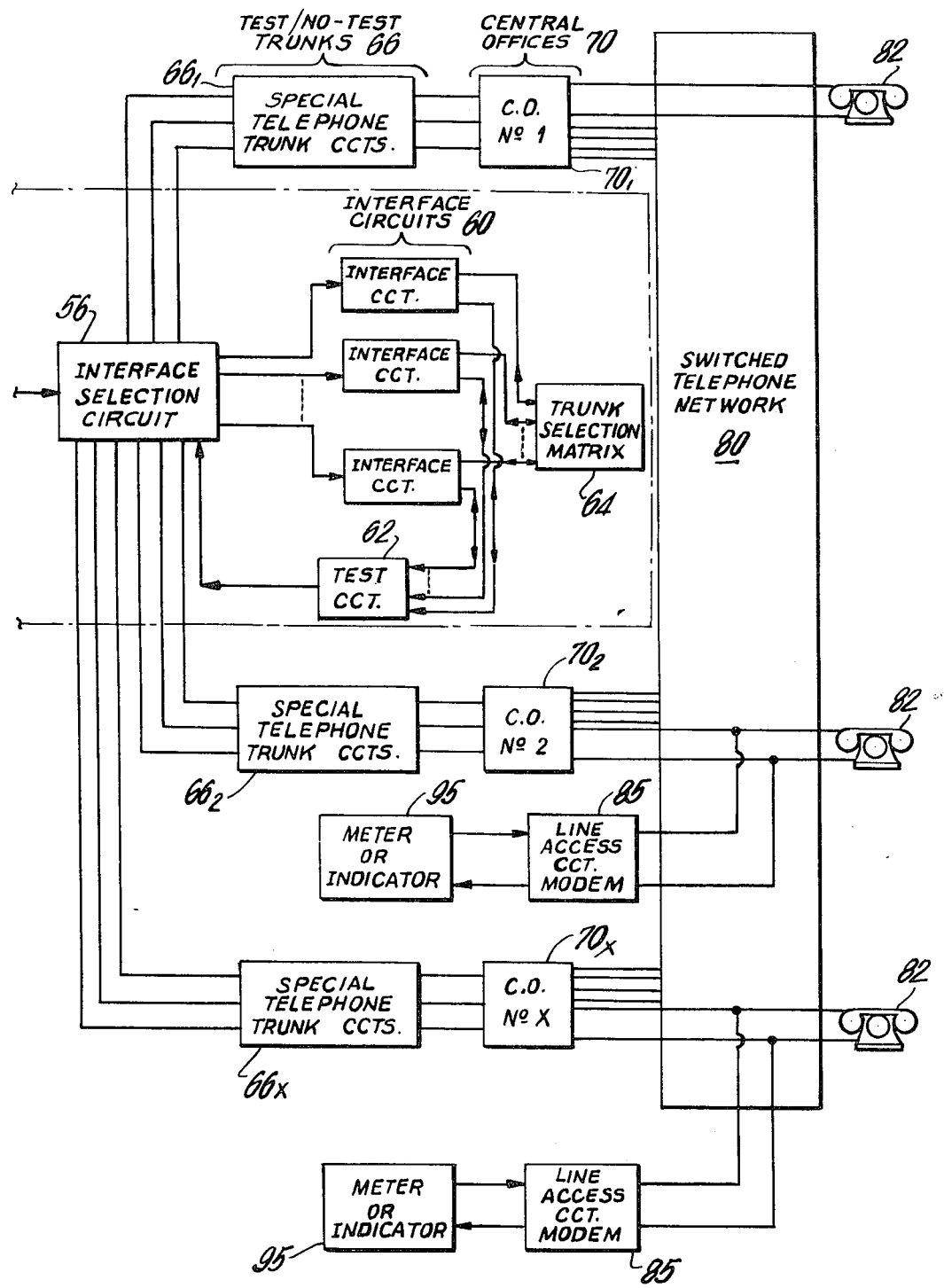

United States Patent [19]
DeLuca et al.

[11] 3,969,594
[45] *July 13, 1976

[54] AUTOMATED TELEPHONY TESTING AND POLLING APPARATUS AND SYSTEM

[75] Inventors: Paul V. DeLuca, Port Washington; John J. Gazzo, Jr., Commack; Vincent F. Santulli, Manhasset; Errol Siegel, New York; Vito Mannino, Holbrook, all of N.Y.

[73] Assignee: Porta Systems Corporation, Syosset, N.Y.

[ * ] Notice: The portion of the term of this patent subsequent to Oct. 15, 1991, has been disclaimed.

[22] Filed: Oct. 15, 1974

[21] Appl. No.: 515,011

Related U.S. Application Data

[63] Continuation-in-part of Ser. No. 313,817, Dec. 11, 1972, Pat. No. 3,842,218, which is a continuation-in-part of Ser. No. 270,058, July 10, 1972, Pat. No. 3,752,940.

[52] U.S. Cl. ............................................. 179/175.3 R
[51] Int. Cl.² .......................................... H04B 3/46
[58] Field of Search ............. 179/175.3 R, 175.2 R, 179/2 A; 444/1

[56] References Cited
UNITED STATES PATENTS

| | | | |
|---|---|---|---|
| 3,410,966 | 11/1968 | Davies | 179/175.3 R |
| 3,506,794 | 4/1970 | Chulak | 179/175.3 R |
| 3,553,376 | 1/1971 | Bogaart | 179/2 A |
| 3,571,530 | 3/1971 | Davies | 179/175.3 R |
| 3,674,947 | 7/1972 | Chulak | 179/175.3 R |
| 3,842,218 | 10/1975 | DeLuca et al. | 179/175.3 R |

OTHER PUBLICATIONS

"Automatic Transmission Meas. . ." by Boesveld et al., Phillips Telecom. Review, May 1969, pp. 59–87.

Primary Examiner—Douglas W. Olms
Attorney, Agent, or Firm—Philip D. Amins

[57] ABSTRACT

Line condition reporting and subscriber polling apparatus employs a central processor for accessing subscriber cable pair via one of plural interface circuits, a trunk selection matrix, a test or no-test trunk, and the subscriber's central office.

Subscriber lines may be seized in accordance with manual or automatically entered information via system input terminals, and an operative code-forming part of the input command, determines whether the system will operate in a line testing and/or polling (as utility meter) mode. In accordance with one aspect of the present invention, digital computer apparatus is employed both for data processing and assembling purposes, and also for circuit control. Further, such circuit control is advantageously effected by a dedicated microprocessor with ancillary instruction (ROM) and read-write (RAM) memories.

10 Claims, 9 Drawing Figures

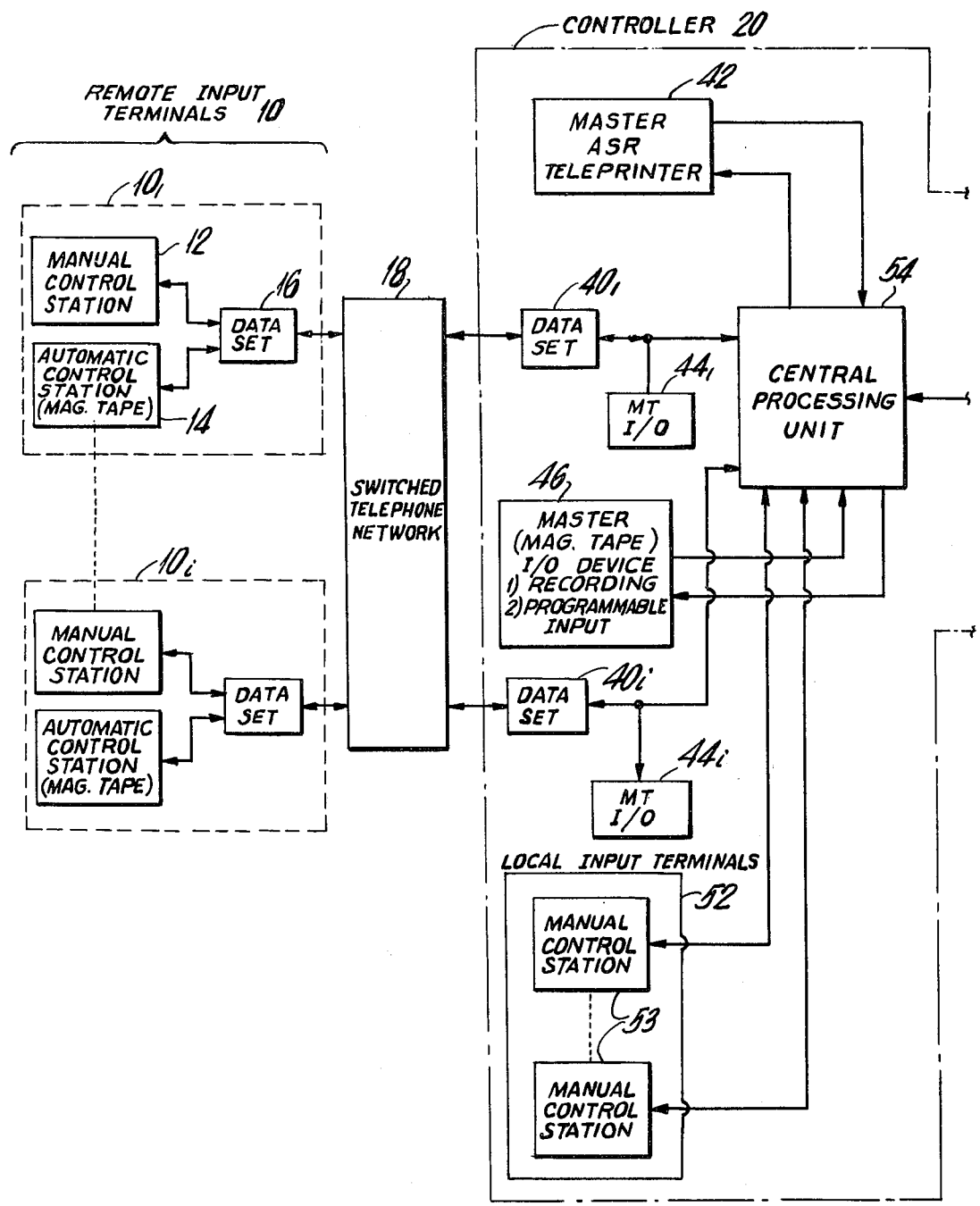
FIG. IA

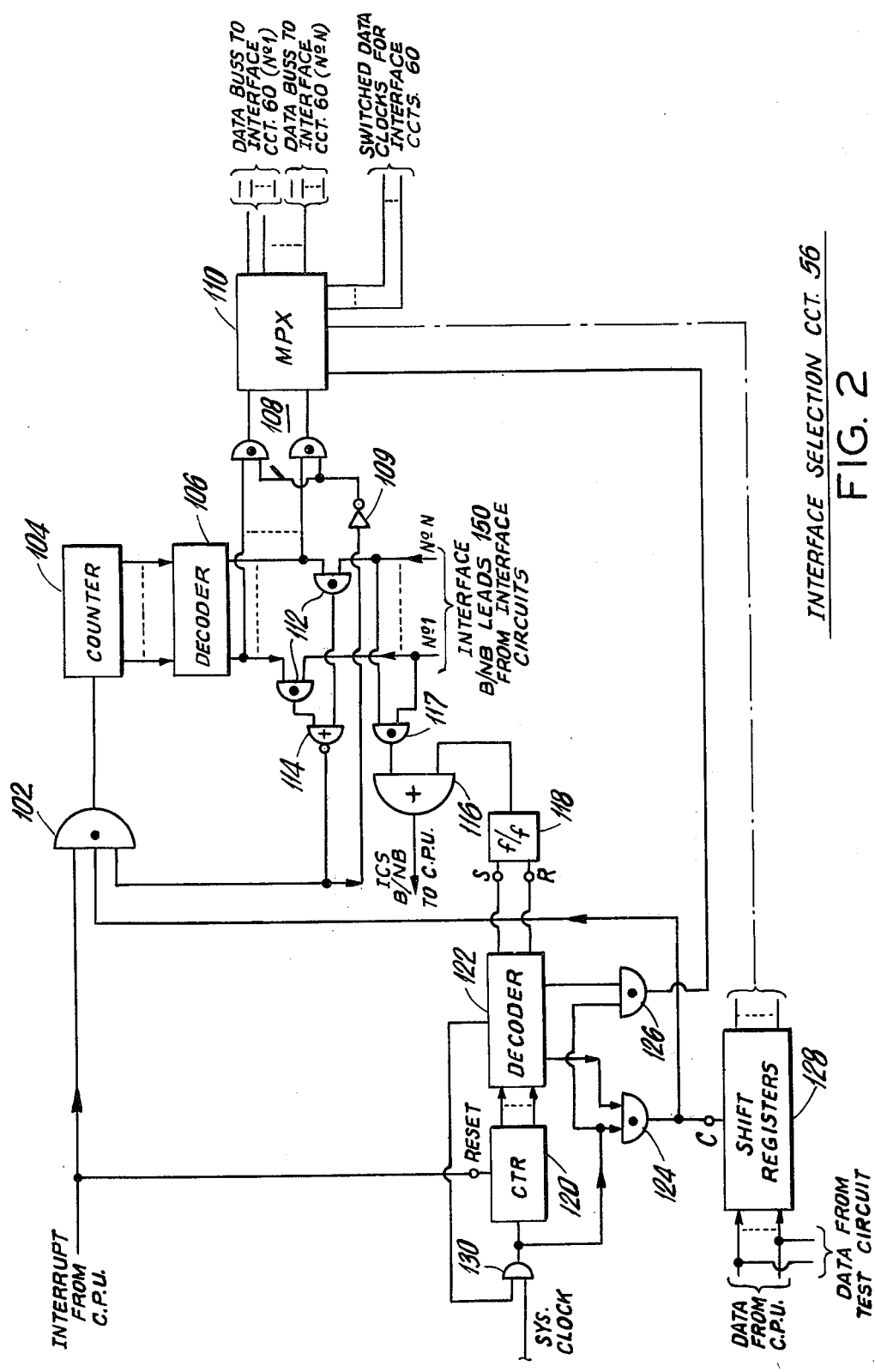

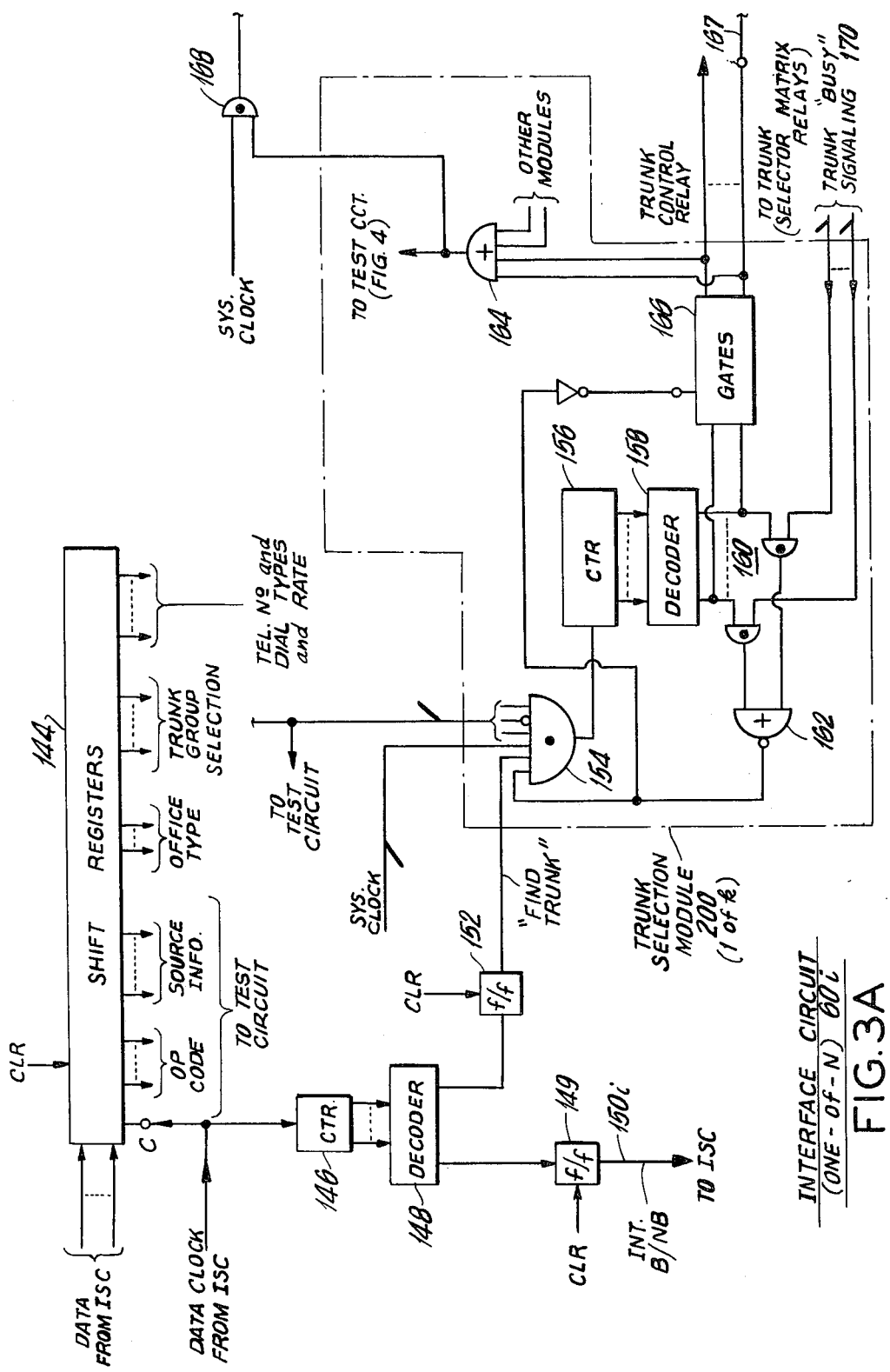

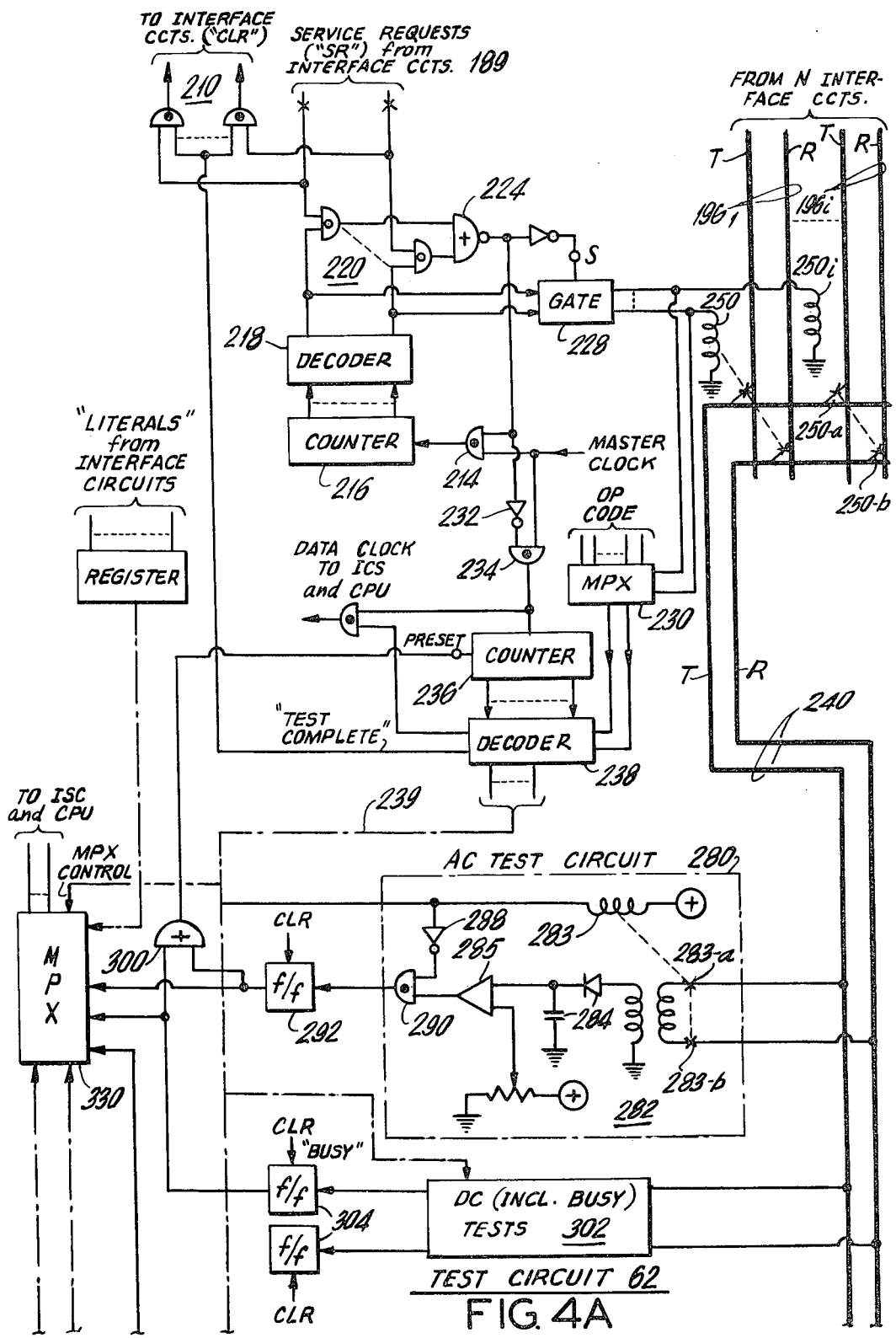

AUTOMATED TELEPHONY TESTING AND POLLING APPARATUS AND SYSTEM

This application is a continuation-in-part of our pending application Ser. No. 313,817, filed Dec. 11, 1972, now U.S. Pat. No. 3,842,218, issued Oct. 15, 1974, for "Automated Telephony Testing and Polling Apparatus" which, in turn, is a continuation-in-part of application Ser. No. 270,058, filed July 10, 1972, for "Line Verification Tester Apparatus", now U.S. Pat. No. 3,752,940 issued Aug. 14, 1973.

DISCLOSURE OF INVENTION

This invention relates to telephony and, more specifically, to automated electronic apparatus for accessing subscriber lines via test or no-test trunks for test, control and/or polling purposes.

It is an object of the present invention to provide improved telephone subscriber line testing apparatus.

More specifically, it is an object of the present invention to provide a line condition reporting system for testing various parameters of interest characterizing the operational status of a subscriber line, either in a manual or automated, sequential basis.

It is another object of the present invention to provide polling apparatus for reporting via a subscriber's telephone cable pair of state of utility meters or other transducers located at the subscriber location, again on a manual or automated basis.

It is a further object of the present invention that line condition reporting and/or polling is effected via test or no-test trunks, as at a repair service bureau, such that the subscriber's telephone does not ring when his equipment is tested or interrogated, and wherein digital computer and microprocessor apparatus for effecting reporting and/or polling data processing and control.

The above and other objects of the present invention are realized in a specific, illustrative line condition reporting and/or subscriber polling system which is operative under central processor control. Input data entry equipment — either manually operative or of the automatic sequencing type, enters telephone subscriber identification, and mode information, into the central processor.

The system apparatus responds to each subscriber test/interrogation request by establishing a connection to the subject subscriber line — without causing ringing. In particular, the connection is established by one of plural interface circuits selected by an interface selector circuit, acting through a trunk selection matrix, test or no-test trunks, and the subscriber's central office.

Once the subscriber's line is seized, a test circuit effects functional operations over the tip-ring conductor path established from the common equipment location to the subscriber line in accordance with the operation code initially entered by the input terminal. In a line test mode, the line is serially examined for spurious voltages, short circuit conditions, line capacitance, and the like. The results of the tests (digital signals comprising "pass-fail" information, or quantizing a parameter value) are accumulated, and time multiplexed to the central processor and, therefrom to an output record terminal such as a tape deck, printer, paper tape or card punch, CRT display or the like.

Correspondingly, in an interrogation mode, the test unit enables a modem at the subscriber location after his line is seized. Transponder equipment then signals to a register at the test unit values for utility meters or the like. Again such information is batched at the test circuit for the duration of a polling cycle, and reported in sequence to an output terminal for record generation.

Figure 3B:
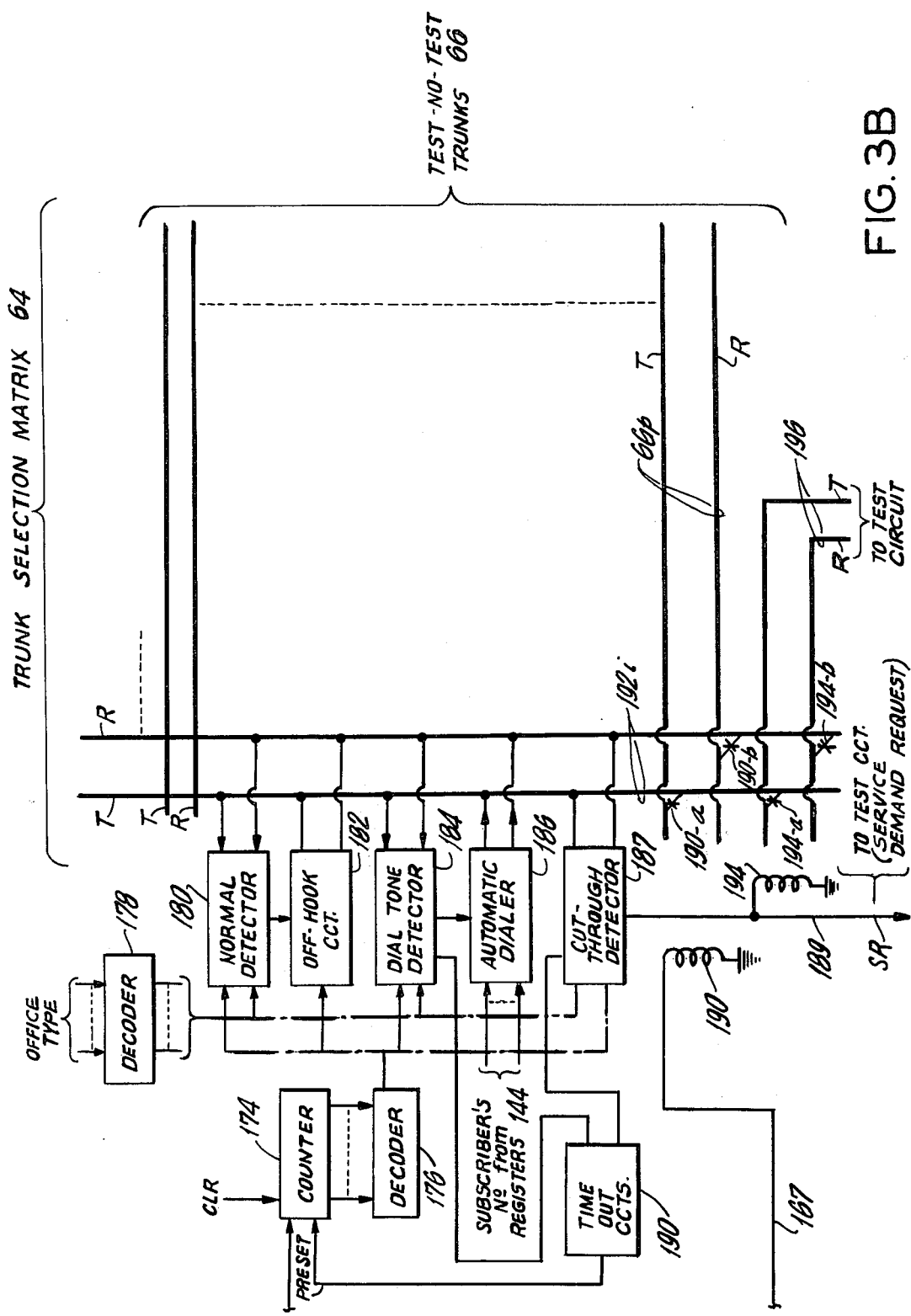
Figure 4B:
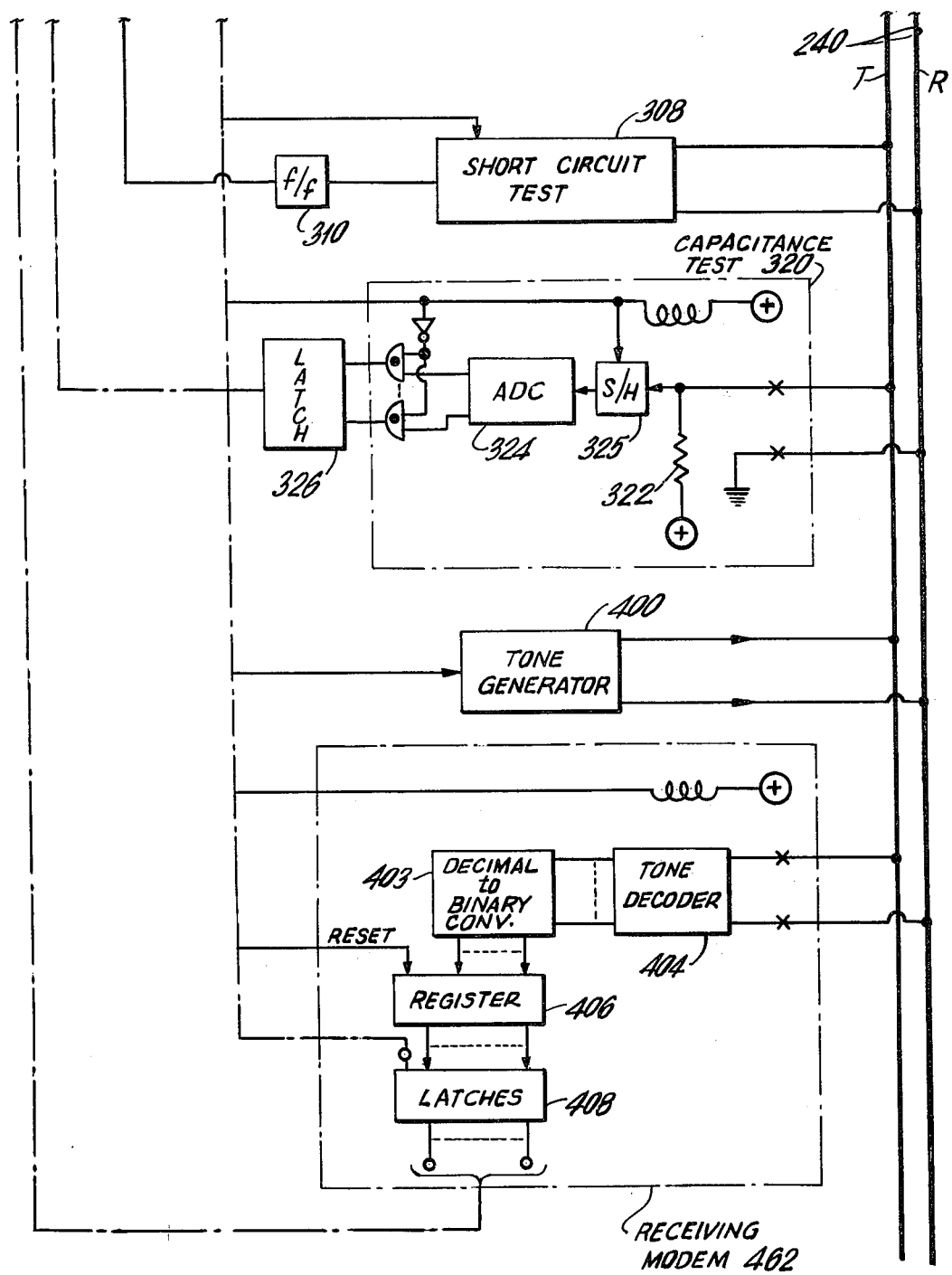
Figure 5:
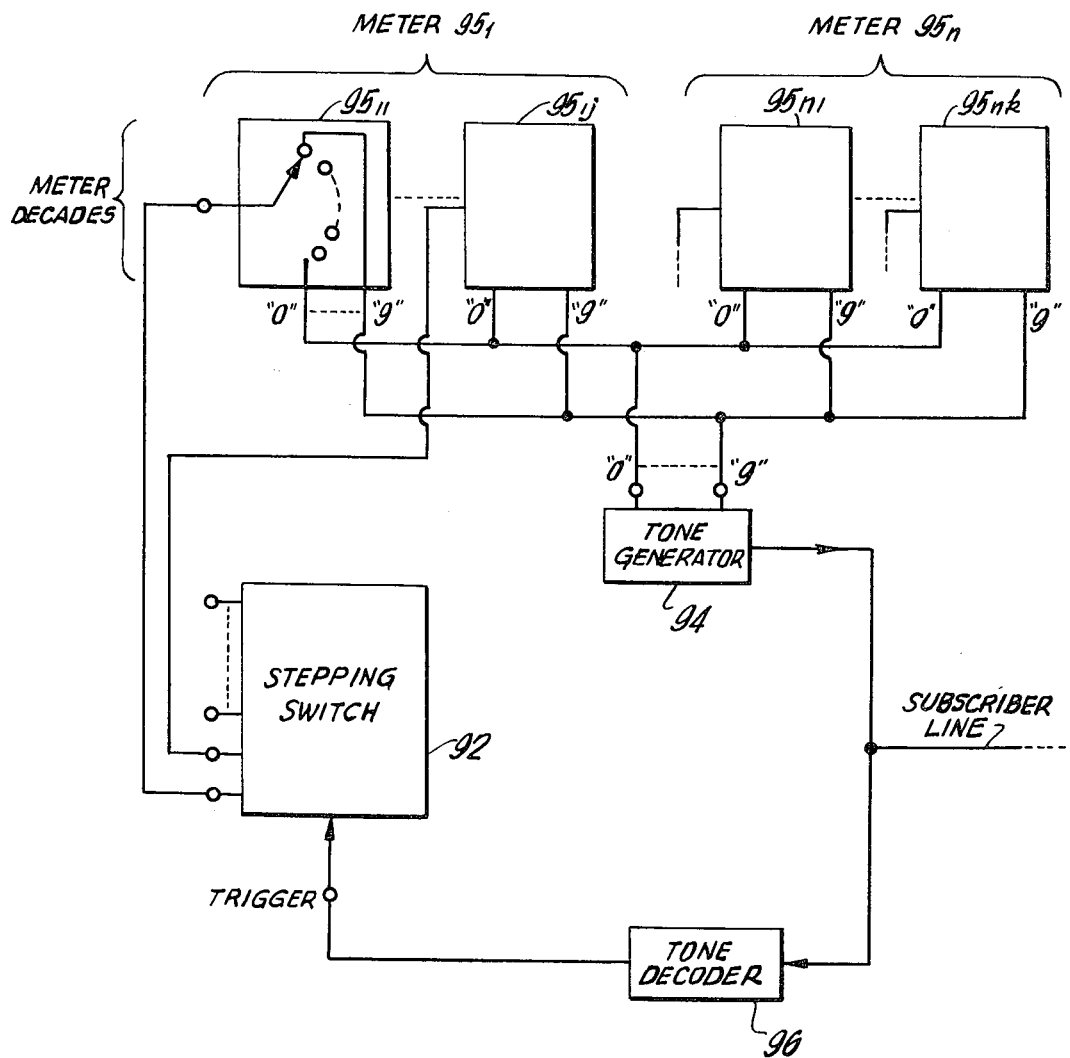
Figure 6:
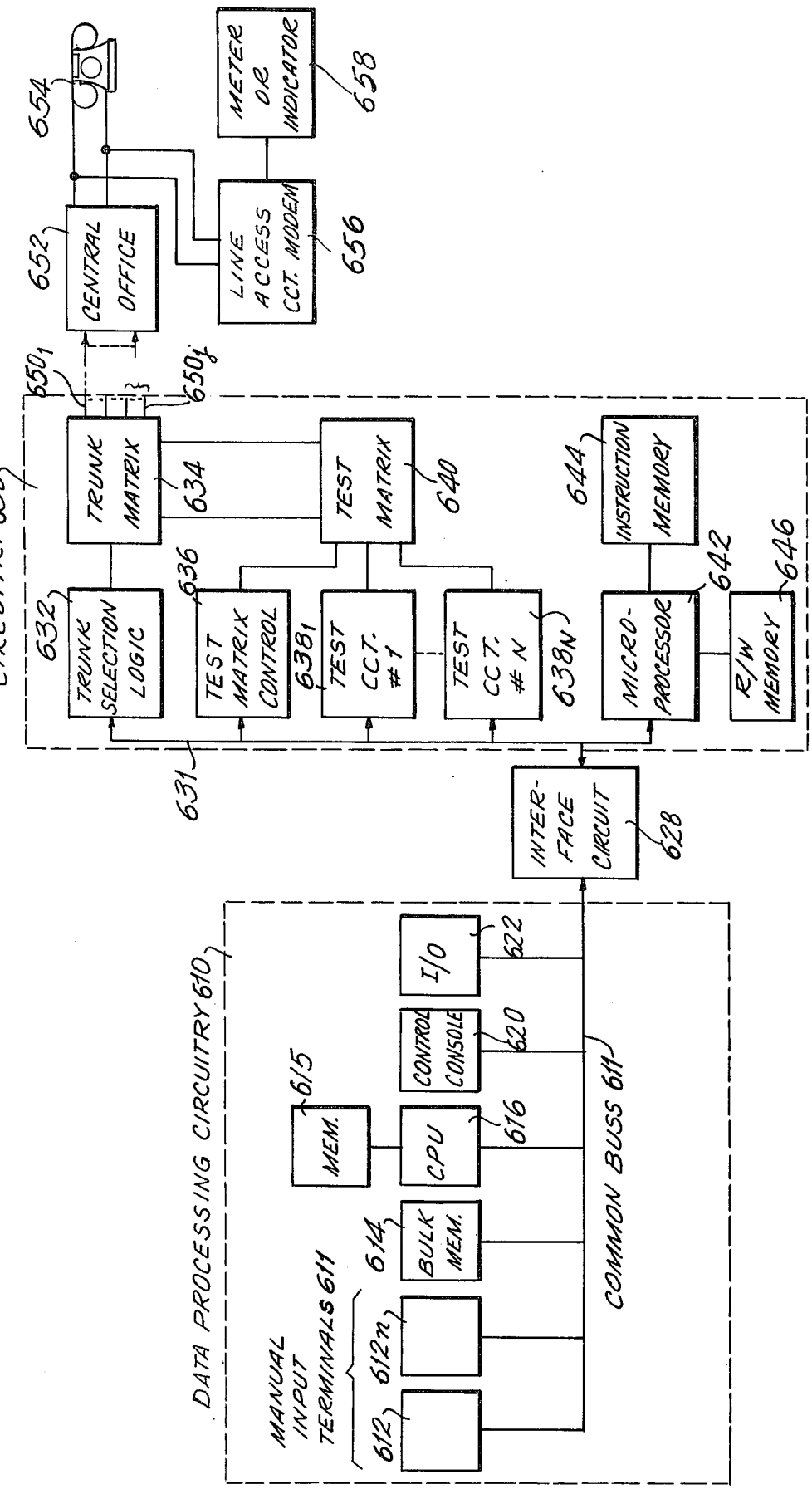

The above described objects, features, and advantages of the present invention will become more clear from a specific embodiment thereof, described in detail hereinbelow in conjunction with the accompanying drawing, in which:

FIGS. 1A and 1B (hereinafter referred to as composite FIG. 1) are the left and right portions of a block diagram depicting a first subscriber line testing/polling system embodiment;

FIG. 2 is a schematic block diagram of an interface selection circuit 56 employed in the FIG. 1 system;

FIGS. 3A and 3B (herein: FIG. 3) respectively comprise the right and left portions of an illustrative interface circuit 60 utilized in the FIG. 1 arrangement;

FIGS. 4A and 4B (herein: FIG. 4) are the top and bottom portions of a test circuit 62 utilized in the FIG. 1 arrangement;

FIG. 5 schematically depicts meter-modem 85 equipment utilized at subscriber locations in the FIG. 1 arrangement; and FIG. 6 is a block diagram depicting a second subscriber line testing/polling system embodiment.

Referring now to FIG. 1, there is shown as system common equipment a controller 20 including a central processing unit 54 which may advantageously comprise a stored program computer including memory. Plural input/output terminals, both remote (10) and local (52) supply input data to the central processor 54, such input data comprising subscriber equipment number identification (e.g., a conventional seven digit telephone number) and an operation code to signal the mode of operation e.g., line test and/or polling) desired, such information being registered in the central processor memory. The remote input terminals 10 may comprise manual control stations 12 (keyboard, teletype or the like) coupled to the computer as by a transmitting data set 16, a conduction path via a switched telephone network 18, and a receiving data set 40. Alternatively, automated equipment such as card readers, a magnetic tape deck, or the like 14 may be employed to automatically generate (and receive) a sequence of subscriber numbers and operation modes for the central processor 54. Further in this regard, a magnetic tape terminal 44 may be employed to batch manually entered input commands to provide semi-automated operation on an efficient basis. The local terminal 52 may similarly comprise plural manual input devices 53 and automated input-output equipment 46.

Communications between the input-output terminals and the central processing unit 54 may proceed on any basis well known to those skilled in the art for data transfer between terminal and a common processor. Thus, for example, the central processor 54 may sequentially poll all input terminals (as for a set flag bit signalling a service request), and may respond to any such request by entering the information from the input terminal into a holding or buffer register in or associated with the central processor. By employing a register dedicated to each input/output terminal, information regarding the identity of an input terminal furnishing a service request is preserved and communicated to the computer. Similar communication obtains between the central processor 54 and system common output equipment 42 such as a teletypewriter, printer, cathode ray tube video display or the like.

In overall functional scope, a plurality of telephone subscriber station sets 82 are each connected to plural telephone central offices 70 via a dedicated cable pair. As one desideratum in telephony, the present invention provides computing apparatus for automatically testing the cable pair assigned to any subscriber to verify operativeness thereof, as in response to a "trouble" inquiry. Moreover in this regard, specific tests are performed on the subscriber pair and the reports thereof furnished as output data to facilitate fault identification in case of actual trouble. In effecting such line testing (and also for polling as described below), it is important that the subscriber not be disturbed by the testing process (i.e., that is, the telephone set not ring when the subscriber line is seized for testing or polling).

As a second principal aspect of the present invention, the computer and line accessing structure of the present invention includes apparatus for automatically reading various conditions obtaining at the subscriber locations — such conditions in general being the state of utility meters. Any other transducers or signal sources may be interrogated as well by the common equipment, such as the state of a burglar or fire alarm, or the like. To this end, bridged across the subscriber cable pair are a line access circuit-modem 85 which is activated on command of the equipment at the computer location and which, when accessed, signals the utility consumption information to the central processor for outputing at the teletypewriter or the like 42 (and/or other system output devices as well).

To effect the above, in response to a service request from one of the system input peripherals, the central processor unit 54 supplies information fully characterizing the service request to an interface selection circuit 56. Such information comprises the seven digit subscriber equipment number, an operation code; source information (i.e., the identity of the input terminal issuing the request); the type of central office (e.g., touch tone, or slow or fast dial) — this information, and other derivative data as well is effected as by a simple table look-up in the central processor 54 which stores the network topography; trunk group selection data — i.e., those trunks by which the subscriber and his central office 70 may be accessed.

The interface selection circuit 56 then selects an available one of a plurality of interface circuits 60. The selected interface circuit 60 selects one of the group of trunks by which the subscriber may be reached; seizes that trunk; effects dialing to seize a subscriber line; and, after cut through, issues a service request to the common system test circuit 62, also completing a connection from the subscriber cable pair and seized trunk to the test circuit.

The test circuit 62 responds to a service request from one of the interface circuits 60 by effecting a series of operations on the subscriber cable pair in accordance with the operation code signaled thereto by the interface circuit. Thus, in a line testing mode, the test circuit 62 performs a sequence of tests examining the subscriber line for spurious alternating current potential; improper D.C. potential; short circuit conditions; provides a quantitative measure of line capacitance; and the like. The results of each test are stored in flip-flops or latches and, upon completion of testing, are multiplexed on a time division basis to the central processor 54 for eventual reporting at a system output terminal and/or storage in a system memory module.

Correspondingly, if the operation code signaled by the interface circuit is a polling function, the test circuit 62 issues command signals which propagate over the seized trunk and subscriber pair to activate the modem 85 at the subscriber location, thereby causing the monitored equipment, i.e., the meter transducer or the like 95, to report its status, such reporting being received and stored in the test circuit 62. Again upon completion of the polling cycle, the stored information is serially reported back to the central processor 54, together with subscriber and source identity for appropriate output record generation.

The interface circuits 60 are connected via a trunk selection matrix 64 — trunk selection being controlled by the several interfaces circuits 60 as above described, to the several telephone central offices 70. In accordance with one aspect of the present invention, the trunks connecting the common equipment 20 with the central offices 70 are special telephone trunks, known as test or no-test trunks. Such trunks have the salient property that, when subscriber equipment is dialed thereover, the subscriber line is seized but the telephone set does not ring. Thus, when the subscriber number is automatically dialed by an interface circuit 60, full access to his cable pair is provided for testing and/or polling purposes but no ring or disturbing signaling is made at the subscriber set.

With the above general system description in mind, attention will now be directed to specific embodiments for the several functional entities shown in FIG. 1. Referring first to the interface selection circuit 56 in FIG. 2, the central processor 54 issues an input command ("interrupt") thereto when it has completed processing of a service request, the interrupt being employed to clear a counter 120 and also to partially enable an AND gate 102. Simultaneously therewith, all necessary data for accommodating a service request discussed above, i.e., the operation code, source and subscriber information, central office type, trunk group designation, and the like is supplied as inputs to plural shift registers 128.

As a first function, the interface selector circuit 56 responds to the input command by generating timing waves to synchronize operation of the interface selection circuit 56 with a system clock. The cleared counter 120 and a counter state decoder 122 connected therewith enable an AND gate 130 such that the system clock pulses pass therethrough to the counter 120. The counter 120 thus provides timing information via the decoder 122 to operate the interface selection circuit 56 in a synchronous manner, the clock pulses passing through the AND gate 130 also being supplied as an input to AND gates 124 and 126. The AND gate 124 is thus enabled at the beginning portion of a cycle of operation for the interface selection circuit 56 and passes the system clock pulses to the clock input of the shaft registers 128 to load data from the central processor therein.

The pulse outputs of the gates 124 are also supplied to the AND gate 102 and initially pass therethrough to a counter 104. The function of the counter 104, a decoder 106, plural AND gates 112 and an OR gate 114 with an inverted output ("OR NOT" gate) is to latch the counter 104 at a state which identifies (and selects) an available one of the system interface circuits 60 to be employed to process the subject service request. To this end, a plurality of leads 150, one from each of the interface circuits 60, is coupled to one input of a dedicated AND gate 112 and signals thereto the busy/not busy status of an associated interface circuit. The second input of each AND gate 112 is connected to a different output of a decoder 106 which decodes the state of the counter 104. Thus, for any state of the counter the decoder 106 partially enables one and only one of the AND gates 112, blocking all other gates.

If the interface circuit 60 status signaling lead 150 indicates "busy", the AND gate 112 is not satisfied. Accordingly, all inputs to the OR gate 114 are low such that the inhibited output of the gate 114 partially enables the AND gate 102. Thus, the next system clock pulse will pass through the AND gate 102 into the counter 104 to advance the state of the counter at which point the status of the next available interface circuit 60 is determined. When an interface is available, as determined from the busy/not busy lead 150 associated therewith (this status may not occur until after a number of scanning cycles in an unusually busy situation), the corresponding AND gate 112 is switched thereby enabling the OR gate 114 such that its inhibited output terminal blocks the gate 102. At that point, the contents of the counter 104 and decoder 106 are latched since no further clocking pulses can pass through the gate 102. Accordingly, the output of the decoder 106 indentifies an available interface circuit 60. The decoder 106 output signals are connected to inputs of AND gates 108 which are partially enabled by the inverted output of the OR gate 114 once an available interface circuit 60 is located. The fully enabled one of the gates 108 signals to a data multiplexer 110 which of the interface circuits 60 is to receive the data stored in the shift registers 128 for processing (and also to receive data clocking pulses from the AND gate 126 during the information transfer interval). During the next interval of processing for the service request, the information stored in the shift register 128 is clocked out through the data multiplexer 110 and delivered to the proper interface circuit 60 for purposes discussed below.

As a signaling function for the interface selection circuit 56, a busy signal (ACS-B/NB) is supplied to the central processor 54 to signal the occupied/available status of the interface selection circuit. To this end, a flip-flop 118 is set by the decoder 122 early during its cycle of operation for the selector circuit 56 while as yet unprocessed data remains in the shift registers 128 (circuit 56 unavailable), and cleared by the decoder 112 after data has been clocked out therefrom (circuit 56 available). The set output of the flip-flop 118, passing through an OR gate 116, comprises a first busy signal. Also, if all of the interface circuits 60 are busy, an AND gate 117 is enabled and signals the busy condition through the OR gate 116 to the central processor 54.

With reference now to FIG. 3 which depicts an illustrative one of the plural like interface circuits 60, data from the interface selection circuit 56 shift registers 128 and multiplexer 110 (FIG. 2) is loaded into the interface circuit shift registers 144 under control of clocking also supplied by the circuit 56. The data present at the plural shift register 144 output stages thus presents the desired service request information, both original and derived, at predetermined locations therein, when clocking is complete. The data clocking pulses from the selection circuit 56 are also counted in a counter 146, the output of which is decoded in a decoder 148 which sets a flip-flop 149 at the beginning portion of a cycle operation for the interface circuit 60. The set flip-flop 149 comprises an "interface busy" output signal on the line 150 to signal the busy status thereof to the interface selection circuit 56. At a time corresponding to that when the registers 144 are fully loaded, the decoder 148 sets a flip-flop 152 which in essence issues a "find trunk" signal to a trunk selector module 200, of which there are a number in each of the interface circuits 60 (only one such module is shown in FIG. 3 for simplicity).

Each of the trunk selector modules 200 includes a master AND gate 154 having a plurality of input terminals (in general, a plurality of which are inhibited) connected to the trunk group identification information stored in the shift registers 144. Accordingly, the pattern of information in the trunk group shift register stages will partially enable the gate 154 in only one module 200, blocking operation in all other modules. It will be assumed that the trunk group binary inputs 101 are stored in the shift registers 144 to enable the gate 154 shown in the drawing which has inputs not inhibited-inhibited-not inhibited connected to the shift registers 144. The gate 154 is further enabled by the find trunk signal issued by the set flip-flop 152. Finally, signals descriptive of the busy or not busy status of the system trunks (specifically those trunks to which the module 200 has access) are coupled to AND gates 160 via leads 170. With system connections so described, the AND gate 154, counter 156, decoder 158, AND gates 160, and OR gate 162 with an inhibited (i.e., inverted) output terminal operate in the manner described above with respect to the FIG. 2 elements 102, 104, 106, 112 and 114 to latch the counter 156 and decoder 158 to a state identifying an available one of the test/no test trunks accessible by the module 200.

The outputs of the decoder 158 and the gate 154 blocking signal supplied at the inverted output of the OR gate 162 control gates 166 (see the gates 108 in FIG. 2) such that one and only one output line of the gates 166 is enabled. That enabled output line (assumed to be the lowest line 167 in the drawing) energizes a relay coil 190 to close normally open form-A contacts 190-a and 190-b. This operatively connects the tip and ring conductors of one of the system test/no test trunks 66 (the trunk $66_p$ for the assumed case) to the tip and ring conductors $192_i$ associated with the interface circuit.

As a next function for the interface circuit 60 after a connection has been established to one of the system trunks 66, a connection must be established to the designated subscriber. To this end, a decoder 178 is connected to the office type designating information stored in the shift registers 144; decodes this information; and supplies control signals to the several system call completion elements described below signaling those elements whether to operate in a tone, a slow or fast dial pulse mode. In the simplest case, apparatus for each mode of signaling will be included, and one such element enabled by the output of the decoder 178, either by electronic gating or electromagnetically as by energizing a selected relay which enables only one of the multiple equipment items (really an array of items as set forth below).

When a trunk (here the trunk $66_p$) is seized, one output of the gates 166 is high, thereby generating a signal at the output of an OR gate 164. The output of OR gate 164 partially enables an AND gate 168 which thereafter passes system clock pulses to a counter 174. The counter 174 and a following counter state decoder 176 sequentially exercise functional circuits 180, 182, 184, 186 and 187 such that dialing or other signalling is impressed on the outgoing trunk $66_p$ to "dial" the subscriber and seize his cable pair via his central office 70. Such automatic dialing equipment is fully described in our above identified copending application. In brief, a normal state detector 180 is first energized to examine the tip and ring conductors of the trunk $66_p$ (connected thereto via the closed relay contacts 190-a and 190-b and the interface tip and ring conductors $192_i$) for a normal condition, i.e., for those voltages normally present on a trunk when it is available for dialing (this confirms trunk availability). The normal state detector 180 may thus comprise voltage comparators for examining the potentials on the tip and ring conductors, and coincidence gating and a flip-flop to energize an off hook circuit 182 to simulate an off hook condition when the normal trunk state is verified.

The off hook circuit 182 responds to an enabling signal from the detector 180, and to the proper time interval signaled by an appropriate output of the decoder 178 by presenting an off hook signal to the trunk to demand service from the central office connected thereto. As again noted in said above identified application, the off hook circuit 182 may simply comprise a relay which impresses about 600 ohms across the tip and ring conductors $192_i$.

Once the off hook condition has been effected, a dial tone detector 194 which varies in construction with the type of central office (the detector 194 may simply comprise voltage sensing comparators similar to the detector 180 for a panel office) detects the presence of a dial tone condition, and responds thereto by enabling an automatic dialer 186.

The dialer 186, of any conventional construction, responds to the enabling signal from the detector 184 by dialing or otherwise signaling the subscriber number stored in the registers 144 and supplied thereto. Finally, a cut through detector 187, similarly connected to the tip and ring conductors 182, detects the voltage reversal (or other) condition at cut through, and provides an output signal SR on a lead 189 which signals that cut through has been achieved. This SR signal on the lead 189 functions as a service request for the issuing interface circuit 60 to the system test circuit 62. The enabled service request on the lead 180 also energizes a relay 194 which closes normally open contacts 194-a and 194-b such that a connection is established by the tip and ring conductors 196 to the subscriber via the contacts 194-a, b, the conductors $192_i$, the trunk $66_p$ and the subscriber's central office 70. The conductors 196 are connected to the system test circuit 62 such that the test circuit has access to the subscriber line for testing or polling as necessary.

Finally it is observed that flip-flops and the like included in the interface circuit 60 which are set responsive to various functional operations therein cleared by a clear (CLR) signal issued thereto by the test circuit 62 upon completion of overall processing for the subscriber testing or polling operation initiated by the circuit 60.

As further disclosed in said aforementioned pending patent application, time out circuitry 190 is energized should operation of the dial tone detector 184 or the cut through detector 187 not be timely effected. If any such excessive delay is encountered, the time out circuitry 190 presets the counte 174 to the starting point in the automatic dialing cycle sequence to initiate a new attempt to complete a connection to the subject subscriber. An additional counter may be connected to the time out circuitry 190 to sound an alarm, or to skip a subscriber cycle, after a predetermined number of unsuccessful call attempts.

Referring now to FIG. 4, there is shown the test circuit 62 of the composite FIG. 1 system. As a first order of affairs, the service requests on the leads 189 from each of the plural system interface circuits 60 are connected as one input to an associated one of an array of AND gates 220. The gates 220, an OR gate 224 with an inhibited output, an AND gate 214, a counter 216 and a decoder 218 operate in a manner discussed hereinabove with respect to corresponding elements 112, 114, 102, 104 and 106 (FIG. 2) and 160, 162, 154, 156 and 158 (FIG. 3) to lock the counter 216 and the decoder 218 to a state which identifies a particular one of the interface circuits which is requesting service. The outputs of the decoder 218 are connected to gates 228 (see gating 108, FIG. 2; and 166, FIG. 3) such that the output of gating 228 operates one and only one of plural relay coils 250 (here assumed to be the coil $250_i$). The conductors $196_i$ from the interface circuit 60 requesting service are thereby connected by the enabled form-A contacts 250-a and 250-b to tip and ring conductors 240 in the test circuit 62.

After a connection is so established, an AND gate 234 is partially enabled to pass master clock pulses therethrough to a counter 236 having its output connected to a decoder 238. The decoder 238 provides timing sequencing signals for the remaining test circuit system functions. Further regarding operation of the decoder 238, a data multiplexing circuit 230 is supplied as data inputs with the operation codes stored in the registers 144 of each of the interface circuits 60, and as control signals with the interface circuit selection outputs of the gates 228. Accordingly, only the operation code of the interface circuit 60 then operatively selected by the test circuit 62 is present at the output of the multiplexer 230 and coupled to the input of the digital decoder 238. The output signals generated by the decoder 238 thus effect command sequence distribution in accordance with both the output of the counter 236 (time) and the output of the multiplexer 230 (desired operation code). Accordingly, as will become more clear from the description hereinbelow, the operation code effectively makes a selection of the operations to be performed by the FIG. 4 test circuit, depending upon whether the test circuit is to operate in a line test or a subscriber polling mode (or both).

Turning now to the actual testing function, during a first time interval, an A.C. test circuit 280 is connected across the tip and ring conductors 240 (and/or between each such conductor and ground) to determine whether an A.C. potential exists therein (as when a subscriber pair is accidentally shorted to line voltage). To this end, a lead on a decoder output bus 239 may energize a relay coil 283 to connect the primary of a transformer 282 across the tip and ring conductors 240. If an A.C. potential is present on the conductors, the voltage induced in the transformer secondary winding generates a positive potential in a peak detector 284 which switches a voltage comparator 285. The resulting output potential from the comparator 285 passes through an AND gate 290 which is enabled during the operative time slot for the A.C. test circuit 280 by an inverter 288. This information is employed to selectively set a flip-flop 292 used for data storage. If an A.C. potential is so present, the flip-flop 292 is set and operates through an OR gate 300 to preset the counter 236 to skip all remaining testing and/or polling operations in view of the dangerous condition obtaining. The counter 236 advances directly into a data outputting mode discussed in detail below to provide an indication of th spurious A.C. result. However, in the normal case where no A.C. potential is present, D.C. potential is not supplied by the peak detector 284 to the comparator 285, such that the flip-flop does not become set.

As a next function (only a portion of which is executed for polling mode operation), plural D.C. condition sensing circuits 302 are connected to the tip and ring conductors 240 to provide plural outputs to characterize the voltage levels on the tip and ring conductors, as via suitably biased voltage comparators. The results of these tests are stored in plural flip-flops (or a register or latch) 304.

As a first one of the D.C. tests, the circuitry 302 examines the tip and ring conductors 304 for a busy condition for the subscriber line (indicated for example in a panel office by a grounded tip conductor and --48 volts on the ring conductor) - it will be recalled that the previous "busy" test was done for the trunk 66, and not the subscriber set. If the line is detected as busy, the busy test flip-flop 304 acts through the OR gate 300 in a manner described above with respect to the flip-flop 292 for advancing (i.e., presetting) the counter to skip the remaining tests. Again, complete structure for effecting the D.C. tests is set forth in detail in the above identified pending application, which is incorporated herein in toto by reference.

Following the test for a busy subscriber line, functioning of a test circuit 62 branches into two distinct modes depending upon whether the operation code signals that a subscriber test or subscriber polling mode of operation is desired. (The system may of course include an operation code which effects both functions. Treating first the test mode of operation, D.C. tests are conducted on the subscriber line by the equipment 302 as above described. The decoder 238 via the timing distributor bus 239 next activates a short circuit test unit 308 which is operatively connected to the tip and ring conductors 240 and which sets a flip-flop 310 during the time slot allocated for short circuit testing if such a condition exists. Short circuit test equipment is shown in said above identified copending application; and may simply comprise a comparator having the relative amplitude of the inputs thereto vary if a portion of a voltage divider connected to one comparator input is short circuited by a short circuit between the tip and ring conductors (or a short circuit to ground from either conductor).

A capacitance test circuit 320 is next energized to quantitatively characterize the capacitance of the subscriber line. The unit 320 may simply comprise a potential source and a resistor 322 connected to the conductors 240 to charge the line with a time constant determined in part by line capacity, and an analog-to-digital converter 324 which samples the instantaneous voltage across the line at a predetermined point in time determined by a timing-sample and hold circuit 325. The digital outputs of the analog-to-digital converter 324 are entered into a latch 326. It will be apparent to those skilled in the art that other tests of interest may be effected as well.

Correspondingly, for a subscriber polling mode of operation, the tests performed by the unit 302 (other than subscriber busy) and by the circuitry 308 and 320 may be deleted. In their place, as determined by the signals on the decoder 238 output distributor bus 239 which effects a decoding over both the operation code and time, a tone generator 400 is first energized by the bus 239 to impress a tone or tone pattern on the tip and ring conductors 240 which is directly connected by the relevant trunk 66 and central office 70 to the subscriber cable pair and station set. As more fully discussed below, the tone or tone pattern activates polling equipment at the subscriber station via the modem 85 there located, causing that modem to generate signals (assumed for purposes of concreteness to be tone encoded) which propagate a receiving modem 402 in the test circuit 62. The sequence of tone signals received by the modem 402, which characterize successive decades of utility meter settings or the like, are received and decoded into a 1-of-10 code by a conventional tone decoder 404. The output of decoder 404 is next converted into binary form by a decimal-to-binary converter 403. The converter 403 output is inserted into a register 406, and strobed therefrom for storage into one of plural latches 408.

Thus, for either the test or polling mode of operation, information is stored in plural latches or flip-flops 292, 304, 310, 326 and/or 408.

Following execution of all operative steps for the test circuit 62 associated with subscriber equipment, the stored information is gated from the storage flip-flop or latches through a multiplexer 330 to the interface selection circuit 56 (FIG. 2) and therefrom via the data bus between the central processor 54 of the circuit 56 to the processor. Also conveyed to the central processor are "literals", i.e., the processed and unprocessed data required to develop a complete output record. This information comprises sources (i.e., requesting input terminal identity subscriber number, trunk group information and the like. Such information is then supplied by the central processor 54 to the appropriate output terminal or terminals for hard copy printing, cathode ray tube display or the like.

Finally, the decoder 238 of the test circuit 62 operates via one of plural AND gates 210 to issue a clear (CLR) pulse to the particular interface circuit 60 for which it has just undergone a cycle of operation to clear all counters, flip-flops and the like in that circuit 60 which thus returns to available status to undergo a new cycle of operation under control of the interface selection circuit 56.

Referring now to FIG. 5, there is shown one illustrative modem and meter apparatus 85, 95 located at the several subscriber stations generally described above with respect to FIG. 1, and which responds to polling inquiries in the manner set forth with respect to the test circuit 62 of FIG. 4. To initiate a polling sequence at a subscriber location, the test equipment 62 tone generator 400 supplies a tone or tone pattern to the subscriber line which is decoded by a tone decoder 96 which, in turn, triggers a self-exciting stepping switch 92. In the manner known per se, stepping switch 92 responds to the trigger pulse by effecting one (and only one) complete rotational sequence wherein a potential is serially supplied via a switch commutator to each of plural switch output terminals.

Located at the subscriber stations are a plurality of meters $95_1 \ldots 95_n$, the meter $95_1$ being shown as comprising j decades of information and the meter $95_n$ including k decades. The meter decades may comprise gear wheels of conventional metering apparatus having mechanically ganged therewith an electrical output in the form of a commutator positioned to engage an appropriate one of ten contacts. To signal the position of each decade of each meter to the test circuit receiving modem 402, the stepping switch 92 supplies a predetermined potential to the commutator of each decade of the several meters in sequence, the 0 . . . 9 output positions of each of the meter decades being connected in common. Further, the common connections of the ten meter decade output terminals are connected to the ten input ports 0 . . . 9 of a tone generator 94. Thus, the potential supplied to the commutator of each meter decade in turn excites one (and only one) of the tone generator input ports. Accordingly, the tone generator 94 impresses a series of tones on the subscriber line for connection to the test circuit 62 receiving modem 402 to communicate the meter consumption information to the test circuit for eventual print out or the like.

The composite organization shown in FIGS. 1-5 has thus been shown by the above to respond to subscriber identity and functional mode input commands by either testing the subscriber lines for various fault conditions, and/or to automatically poll transducer, meters or the like at the subscriber locations; and to provide output indications of the test or polling procedure conducted. Moreover, such testing and/or polling is conducted only when subscriber and trunk equipment is not otherwise busy; and is effected via test trunks or no-test trunks to thereby provide minimal inconvenience to a subscriber.

The arrangement of FIGS. 1-5 employs special purpose digital electronics to provide the subscriber line accessing and exercising control, data communication with the central processing unit, and the like. Turning now to FIG. 6, there is shown a second illustrative subscriber line testing/polling system wherein a microprocessor 642 with an attendant instruction memory 644 (typically, a read only memory (ROM) of fixed contact) and read-write (RAM) of variable content is utilized as a controller.

As before, for the embodiment of FIGS. 1-5, subscriber identification, mode information, test results, consumption data polled is supplied by 1 to 1 between manual input terminals 611, a bulk memory 614, a central console 620, and one or more other input/output devices 622. All such may be controlled over a common bus 611 by a central processor 616 operating in conjunction with a program/data memory 615. Further, the central processor 616 is adapted to communicate with the microprocessor 642 over the bus 611 via any interface circuit 628. The processor 616 and the memory 615 may advantageously comprise a minicomputer, any standard, commercially available computer, or a Bell System ESS machine.

By way of functional overview, control for the FIG. 6 arrangement is conceptually treated as including a plurality of functional "channels" (compare FIG. 1B having a number of different interface circuits 60) – each channel in active use doing a different task, all such tasks proceeding simultaneously. Thus, one channel may be polling one subscriber line; a second testing a different subscriber line; and so forth. That is, in the language of computer technology, the data processing equipment 616, 620, 642, 644, and 646 is time shared to effect a number of different operations essentially contemporaneously.

The actual division of responsibility between the central processor 616, 615 and the controller microprocessor 642, 644, 646, is a matter of design choice, depending upon the specific processors 616, 642 used; the desired degree of hardware vis.-a-vis. software balance of sophistication; and the like.

In its essential operational functioning, the processor 616 transmits to the microprocessor 642 serial messages having a channel identification field to identify the message receiving channel; a data control bit to identify the nature of the message; and a field which may be data (e.g., subscriber number, trunk number, or the like) or a command (e.g., dial, line release, test for the incidence of a specified voltage, poll (interrogatory) modem, etc., all as described in detail above).

The simplest conceptual form of control for the microprocessor structure is a fixed periodically repeating timing cycle. Accordingly, where this is employed (via conventional timing means not shown), theh data or command for the intended channel is stored in an appropriate memory cell (e.g., in memory 646) as the next task to be done during processing for that channel.

During the next period (time slot) for that "channel", the processor 642 extracts the command (assuming it to be one), and triggers the appropriate test circuit 638 (if the command is a test). The test circuit 638 may comprise electronic structures corresponding to that for the circuit 62 (see FIGS. 4A and 4B). The circuitry, when triggered by the microprocessor 642, effects its associated operation on the intended subscriber line via the test or no test trunk matrix 650 (comparable to matrix 64), and the subscribers central office 652. Such triggering may be implemented by issuing identity codes or dedicated conductors of the common bus 631 in the manner long known. If a polling operation is implemented, the modem 656 and indicator 658 are interrogated in a manner directly analogous to the devices 95 and 85 of FIG. 1B. As before (for FIGS. 1-5), the trunk is selected by trunk selection logic 650 and the functional test circuit 638 most simply comprising relays.

When a data message is transmitted to the microprocessor from the central processor 616 (e.g., a subscriber number), this is stored and utilized as by loading an automatic dialer (see FIG. 3B) which will typically be one of the central elements connected to the bus 631 of the composite central processing circuitry 630.

Correspondingly, the microprocessor 642 stores test results, polled data and the like is the variable memory 646. During the appropriate time slot portion of the composite functional cycle, and appropriate message is constructed and sent by the microprocessor 642 to the central processor 616 via the interface circuit 628 and bus 611. Such message may comprise a channel identifying field, a data/status bit; and data (e.g., a test result, or a meter value or digit thereof), or status ("test failed", "need more data", "no connection possible", a general acknowledgement, or the like) information. This information is receiveed by the central processor 616 and used in an appropriate manner. Thus, if several tests for a single subscriber are being conducted, the single test result communicated is stored in the memory 615 and the command message to being the next test sent to the microprocessor 642. If a trouble status message is received, appropriate program branching is effected by the central processor 616 to properly respond to the reported status condition.

In summary then, the arrangement of FIG. 6 effects the same functional ends as that of the FIGS. 1–5 apparatus, but in an improved manner via an arbitrarily large number of channels under program control. This substantially reduces the system hardware requirement while providing rapid and reliable system operation.

The above description arrangement is merely illustrative of the principles of the present invention. Numerous modifications and adaptations thereof will be readily apparent to those skilled in the art without departing from the spirit and scope of the present invention. Thus, for example, in the FIG. 6 arrangement, the automatic dialer and test apparatus may largely comprise central signalling from the microprocessor 642 pursuant to software routines stored in the instruction memory 644. Thus, automatic dial pulse dialing may be effected by a simple line interrupting relay controlled by the microprocessor.

Also, the RAM 646 may have dedicated storage areas and instruction location counters for each channel to simplify central management.

What is claimed is:

1. In combination in telephone subscriber line energizing apparatus, a stored program controlled central processor, input/output means for supplying to said central processor subscriber information and for storing subscriber information supplied thereto from said central processor, control processing circuitry including stored program controlled microprocessor means for bilaterally communicating with said central processor, a matrix of trunks adapted to not cause ringing when a subscriber line is seized thereover, means responsive to said microprocessor means to select one of said trunks, and line energizing means responsive to said microprocessor means for energizing a subscriber line and for communicating the results of such energization to said microprocessor means for translation to said central processor.

2. A combination as in claim 1 further comprising a plurality of subscriber lines connectable to said matrix trunks, a consumption metering transducer means connected to plural of said subscriber lines, and wherein said line energizing means comprises means for interrogating a transducer means connected thereto via a selected one of said nonringing trunks.

3. A combination as in claim 1, wherein said microprocessor means comprises a microprocessor, a read only instruction memory, and a read and write memory.

4. A combination as in claim 3, further comprising timing means for the time sharing said microprocessor with respect to plural independently functioning channels.

5. A combination as in claim 1, wherein said line exercising means comprises plural testing means each responsive to a different line condition.

6. In combination, first stored program controlled digital processing means, at least one input source means connected to said processing means, said input source means including means for supplying to said processing means telephone subscriber identification number, said processing means including means for determining the operation desired by said input source means for said subscriber number, plural special trunks each adapted to not cause subscriber ringing when a subscriber is accessed thereover, stored program controlled second digital processing subscriber access means responsive to information entered in said first processing means for accessing a selected telephone subscriber via a selected one of said special trunk means, test circuit means, and means for automatically connecting said test circuit means to said selected special trunk means.

7. A combination as in claim 6, wherein said test circuit means includes means for serially and automatically effecting plural tests on a subscriber line connected thereto.

8. A combination as in claim 6, further comprising a plurality of subscriber stations connectable to said special trunks, plural signal source means located at plural subscriber stations, and a modem at said plural subscriber stations for selectively enabling a connection from said signal source means to the subscriber line, wherein said test circuit means further comprise means for operatively engaging said modem, and means for receiving information transmitted from said modem.

9. A combination as in claim 7, wherein said input means comprises means for automatically entering plural subscriber information requests in said processing means.

10. A combination as in claim 8, wherein said input means comprises means for automatically entering plural subscriber information requests in said processing means.

* * * * *